(12) United States Patent
Fariña Nercellas et al.

(10) Patent No.: US 12,429,024 B2
(45) Date of Patent: Sep. 30, 2025

(54) WIND TURBINE BLADE SHEAR WEB

(71) Applicant: Vestas Wind Systems A/S, Aarhus N (DK)

(72) Inventors: Laura Fariña Nercellas, Ciudad Real (ES); Houriyeh Marashi, Risskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/253,504

(22) PCT Filed: Nov. 18, 2021

(86) PCT No.: PCT/DK2021/050338
§ 371 (c)(1),
(2) Date: May 18, 2023

(87) PCT Pub. No.: WO2022/105976
PCT Pub. Date: May 27, 2022

(65) Prior Publication Data
US 2024/0011462 A1 Jan. 11, 2024

(30) Foreign Application Priority Data
Nov. 19, 2020 (DK) .......................... PA 2020 70768

(51) Int. Cl.
*F03D 1/06* (2006.01)
*B29D 99/00* (2010.01)
(Continued)

(52) U.S. Cl.
CPC ....... *F03D 1/0675* (2013.01); *B29D 99/0028* (2013.01); *B29C 70/68* (2013.01);
(Continued)

(58) Field of Classification Search
CPC ............ B29D 99/0003; B29D 99/0025; B29D 99/0028; F03D 1/0684; F03D 1/0675;
(Continued)

(56) References Cited

U.S. PATENT DOCUMENTS

| 2009/0026315 A1 | 1/2009 | Edelmann et al. |
| 2017/0320275 A1* | 11/2017 | De Waal Malefijt ........................ B29D 99/0003 |
| 2019/0178227 A1* | 6/2019 | Hawkins ............ B29D 99/0028 |

FOREIGN PATENT DOCUMENTS

| CN | 104325577 A | * | 2/2015 |
| DE | 102017126276 A1 | * | 5/2019 |

(Continued)

OTHER PUBLICATIONS

Sapi et al.; "Filler materials in composite out-of-plane joints—A review"; Composite Structures, Elsevier Science Ltd, GB, vol. 207, Sep. 29, 2018 (Sep. 29, 2018), pp. 787-800 (Year: 2018).*

(Continued)

*Primary Examiner* — Nathaniel E Wiehe
*Assistant Examiner* — Art Golik
(74) *Attorney, Agent, or Firm* — Wood Herron & Evans LLP

(57) ABSTRACT

A method of making a wind turbine blade shear web. The method comprises providing a shear web mould. The shear web mould has a longitudinally-extending main surface shaped to form a main panel of the shear web, and first and second longitudinally extending side surfaces shaped to form respective first and second flange portions of the shear web. The method further comprises arranging one or more layers of fibrous material against the main surface and against the first and second side surfaces of the mould to form a layup that is generally C-shaped in cross-section. The method further comprises arranging a pre-cured return flange on the layup, providing uncured resin to the fibrous (Continued)

material of the layup and between the layup and the pre-cured return flange, and curing the uncured resin to co-bond the pre-cured return flange and the C-shaped layup.

17 Claims, 6 Drawing Sheets

(51) Int. Cl.
  *B29C 70/68* (2006.01)
  *B29K 105/08* (2006.01)
  *F03D 80/30* (2016.01)

(52) U.S. Cl.
  CPC .. *B29D 99/0025* (2013.01); *B29K 2105/0872* (2013.01); *F03D 1/0677* (2023.08); *F03D 1/0679* (2023.08); *F03D 1/0681* (2023.08); *F03D 1/0682* (2023.08); *F03D 1/0684* (2023.08); *F03D 80/301* (2023.08); *F05B 2220/30* (2013.01); *F05B 2230/23* (2013.01); *F05B 2240/30* (2013.01)

(58) Field of Classification Search
  CPC .... F03D 1/0677; F03D 1/0679; F03D 1/0681; F03D 1/0682; F03D 1/0685; F03D 1/0687; F03D 1/0688; F03D 1/069; F03D 80/301; B29C 70/68; B29C 70/86; B29C 70/865
  See application file for complete search history.

(56) References Cited

FOREIGN PATENT DOCUMENTS

| EP | 2755815 B1 * | 2/2017 | ............. B29C 33/48 |
|---|---|---|---|
| EP | 3288750 A1 | 3/2018 | |
| WO | 2016066816 A1 | 5/2016 | |
| WO | 2016177375 A1 | 11/2016 | |
| WO | 2018137740 A1 | 8/2018 | |
| WO | WO-2019020152 A1 * | 1/2019 | ......... B29D 99/0028 |
| WO | 2020119871 A1 | 6/2020 | |

OTHER PUBLICATIONS

Danish Patent and Trademark Office, examination report issued in corresponding DK Application No. PA 2020 70768, dated Apr. 8, 2021.
International Searching Authority, International Search Report and Written Opinion issued in corresponding PCT Application No. PCT/DK2021/050338, mailed Feb. 18, 2022.
Sapi Zsombor et al., Filler materials in composite out-of-plane joints—A review, Composte Structures, Elsevier Science Ltd. GB, vol. 27, Sep. 29, 2018, pp. 787-800, XP085525476.

* cited by examiner

WIND TURBINE BLADE SHEAR WEB

TECHNICAL FIELD

The present invention relates generally to wind turbine blades and more specifically to a method of manufacturing a wind turbine blade shear web.

BACKGROUND

Modern wind turbine blades typically comprise a shell defining the aerodynamic contour of the blade and one or more longitudinally-extending spars which act as the main load-bearing structures of the blade. A spar typically comprises a shear web which is configured to take up the shear loads experienced by the wind turbine blade in use, and which is connected between inner surfaces of opposing windward and leeward sides of the shell.

The shear web may comprise an upper and/or lower flange via which the shear web is connected to the blade shell. For example, the shear web may be substantially I-shaped in cross section, with the flanges extending from a main panel of the shear web. Typically, shear web flanges comprise one or more layers of reinforcing fibres to help transfer shear loads to and from the shell. Whilst the flanges provide an increased surface area for connecting the web to the shell, the inclusion of such flanges can introduce a number of challenges when manufacturing the shear web.

The I-shaped shear web may be formed by arranging one or more layers of fibrous material in a mould. The layers of uncured fibrous material may be "co-cured" to simultaneously cure and bond the uncured elements together using resin for example. Typically, the mould is configured such that fibrous material arranged to form flanges on one side of the shear web extend substantially downwards, and fibrous material arranged to form the opposed return flanges on the other side of the shear web extends substantially upwards. Such an arrangement can make it difficult to secure the upstanding fibrous material of the return flange in place during manufacture of the web. For example, the layers of fibrous material are not self-supporting, and may slide down in the mould or move relative to one another. Further, the fibrous material may wrinkle or crease due to gravity and the shape of the mould. Any wrinkles or inaccuracies in the layup of fibrous material may lead to weaknesses or stress concentrations in the I-shaped moulded shear web.

It is against this background that the present invention has been developed.

SUMMARY OF THE INVENTION

In a first aspect of the invention there is provided a method of making a wind turbine blade shear web. The method comprises providing a shear web mould. The shear web mould has a longitudinally-extending main surface shaped to form a main panel of the shear web, and first and second longitudinally-extending side surfaces shaped to form respective first and second flange portions of the shear web. The method further comprises arranging one or more layers of fibrous material against the main surface and against the first and second side surfaces of the mould to form a layup that is generally C-shaped in cross-section. The method further comprises arranging a pre-cured return flange on the layup, providing uncured resin to the fibrous material of the layup and between the layup and the pre-cured return flange, and curing the uncured resin to co-bond the pre-cured return flange and the C-shaped layup.

The fibrous material of the layup may be dry fibrous material or fibrous material that has been pre-impregnated with uncured resin, so-called 'prepreg' material, or the fibrous material may comprise a combination of dry and prepreg material. The step of providing uncured resin to the fibrous material may comprise supplying resin to the mould, for example in an infusion process. In the case of prepreg fibrous material, this has already been provided with uncured resin, i.e. it has been pre-impregnated, and so there may be no need to supply any additional resin to the mould. However, additional resin may still optionally be supplied to the mould when using prepreg material, for example in an infusion process.

Co-bonding is defined herein as the bonding together of a pre-cured element and an uncured element at the same time as the uncured element is cured.

References to a pre-cured return flange will be understood to mean a return flange which is formed and cured offline in a separate manufacturing process before being co-bonded with the C-shaped layup to form the shear web. During manufacture of the shear web, the return flange is therefore pre-cured in comparison to the C-shaped layup of fibrous reinforcing material, which is not-precured.

Preferably, the or each pre-cured return flange may be formed of a material which, when cured, has a glass transition temperature that is higher than the temperature required to cure the C-shaped layup and to thereby co-bond the return flange with the C-shaped layup.

Preferably, the or each pre-cured return flange is arranged on the layup such that it extends in an opposite direction to the first and/or second flange portion. Preferably, the or each pre-cured return flange is arranged such that the first or second flange portion and the pre-cured return flange are generally on the same plane.

The shear web is preferably generally I-shaped in cross-section. The method preferably comprises co-bonding a first pre-cured return flange at a first end of the C-shaped layup and a second pre-cured return flange at a second end of the C-shaped layup.

The or each pre-cured return flange may be generally L-shaped when viewed in cross-section.

The or each pre-cured return flange may comprise fibrous reinforcing material. Preferably the fibrous reinforcing material is biaxial fibrous reinforcing material.

The method may further comprise arranging filler material in a space defined between the or each pre-cured return flange and the C-shaped layup. The filler material may be arranged between a corner of the return flange and a corner of the C-shaped layup. The filler material may comprise one or more of: reinforcing fibres, foam, polystyrene, balsa and cured or uncured adhesive. The filler material may comprise a rope of fibres, preferably glass fibres.

The method may further comprise arranging one or more further layers of fibrous material on top of the C-shaped layup and on top of a portion of the pre-cured return flange that said portion is sandwiched between layers of fibrous material. The layers of fibrous material may comprise biaxial fibres.

The method may further comprise arranging a base layer of fibrous reinforcing material at one side of the mould such that it spans the pre-cured return flange and the first or second flange portion of the C-shaped layup. The base layer may be a layer of dry or prepreg fibrous material. The base layer may be a pre-cured layer.

The or each pre-cured return flange may be a moulded part.

In a second aspect of the present invention there is provided a wind turbine blade shear web. The shear web comprises at least one pre-cured return flange portion co-bonded with a main portion of the shear web.

The main portion of the shear web may be generally C-shaped in cross section. The pre-cured return flange portion may be generally L-shaped in cross-section.

The shear web is preferably generally I-shaped in cross-section. The shear web preferably comprises a pre-cured return flange portion co-bonded at each end of a main panel of the shear web.

Preferably, the or each pre-cured return flange portion extends in an opposite direction to a first and/or second flange portion of the C-shaped main portion of the shear web. Preferably, the or each pre-cured return flange and one of the first or second flange portions are generally on the same plane.

BRIEF DESCRIPTION OF THE FIGURES

Embodiments of the present invention will now be described by way of non-limiting example only, with reference to the accompanying figures, in which.

DETAILED DESCRIPTION

Figure 1:
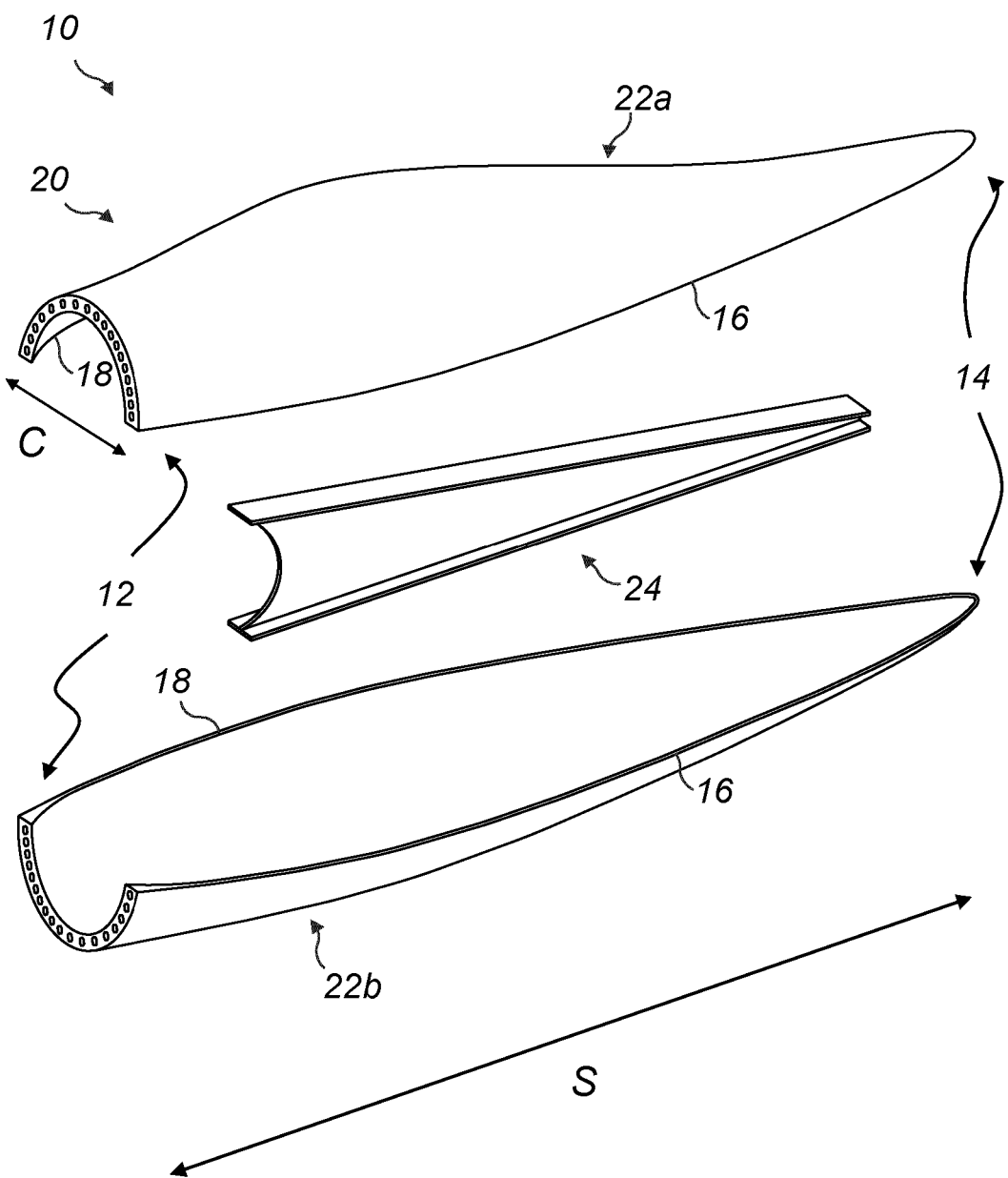
FIG. 1 is a schematic exploded view of a wind turbine blade comprising a shear web arranged inside a shell.

FIG. 1 is a schematic exploded view of a wind turbine blade 10. The blade 10 extends longitudinally in a spanwise direction (S) between a root end 12 and a tip end 14, and transversely in a chordwise direction (C) between a leading edge 16 and a trailing edge 18. The blade 10 comprises a shell 20 which may be formed of a first (e.g. windward) half shell 22a and a second (e.g. leeward) half shell 22b. In some examples, the half shells 22a, 22b are of composite construction, formed of materials such as glass-fibre reinforced plastic (GFRP). When the half shells 22a, 22b are connected together, the shell 20 defines a substantially hollow interior.

The wind turbine blade 10 comprises a shear web 24 that extends longitudinally in the spanwise direction (S) inside the shell 20, i.e. inside the hollow interior of the blade 10. The shear web 24 forms part of a spar structure which is configured to absorb bending and torsional loading of the blade 10 in use. The shear web 24 is connected between inner surfaces of the shell 20, for example by adhesive.

Figure 2:
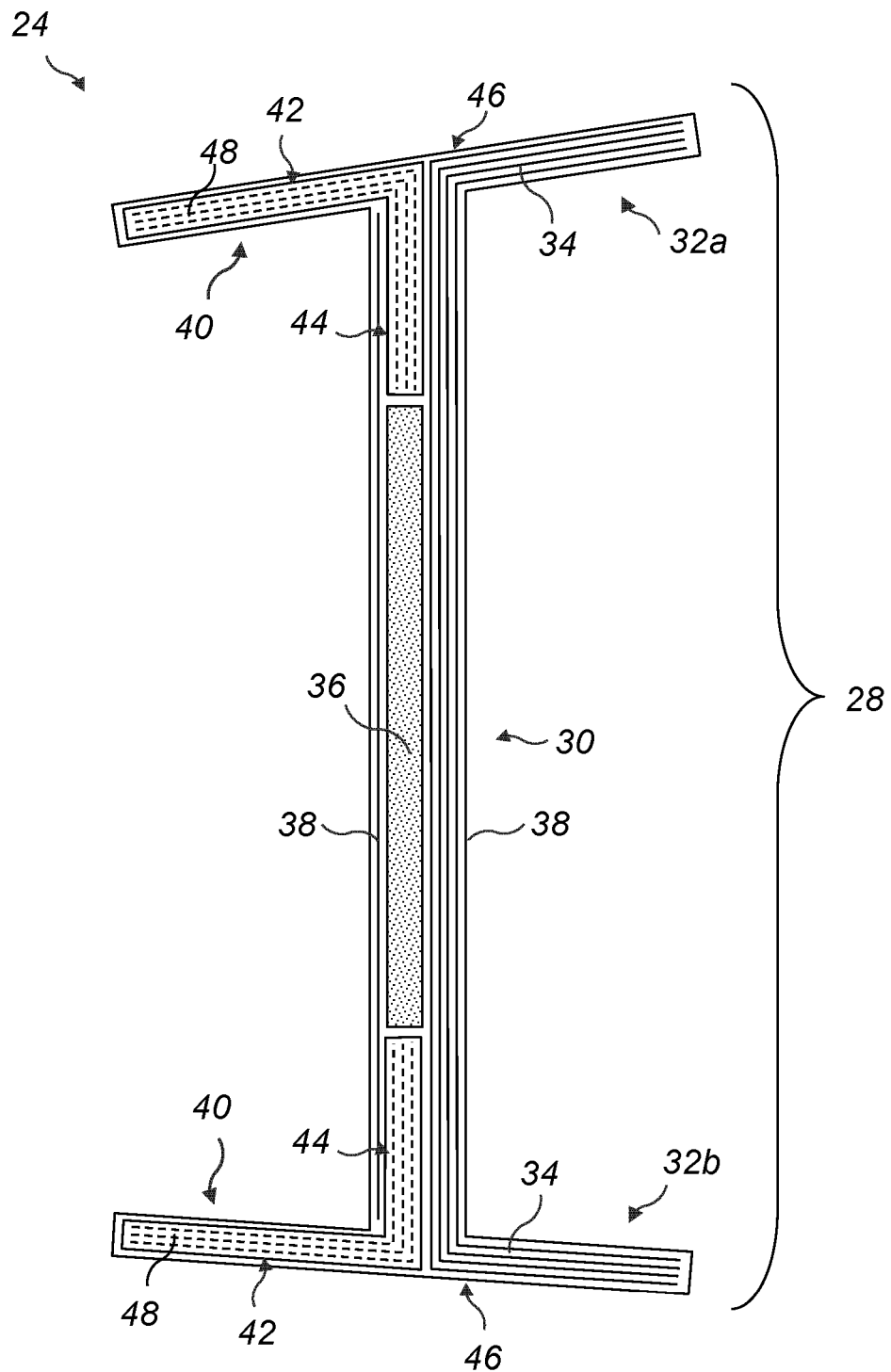
FIG. 2 is a schematic cross-sectional view of the shear web showing pre-cured return flanges co-bonded with a main C-shaped portion of the web.

Referring now to FIG. 2, the shear web 24 comprises a main portion 28 which is substantially C-shaped in cross section. The C-shaped main portion 28 of the shear web 24 comprises a main panel 30 and first and second flange portions 32a, 32b that extend transversely to the main panel 30 on a first side of the shear web 24. The flange portions 32a, 32b may comprise reinforcing fibrous material, such as plies 34 of material comprising biaxial glass fibres, to transfer shear loads effectively between the shell 20 and the main panel 30 in use.

In some examples, as shown in FIG. 2, the main panel 30 of the shear web 24 may preferably be a sandwich structure comprising core material 36 arranged between composite skins 38. The core material 36 may comprise a structural foam material for example. The core material 36 may be configured to separate the composite skin 38 on the first side of the shear web 24 from the composite skin 38 on a second side of the web 24 to increase the stiffness of the main panel 30.

Notably, shear webs 24 in accordance with aspects of the present invention further comprise a pre-cured return flange portion 40. The pre-cured return flange 40 extends transversely to the main panel 30 on the second side of the shear web 24. The shear web 24 may comprise a plurality of pre-cured return flanges 40 as shown in FIG. 2 for example. The pre-cured return flanges 40 preferably extend in an opposite direction to the flange portions 32a, 32b of the C-shaped main portion of the web 24. As such, the shear web 24 may be substantially I-shaped in cross-section.

In some examples the pre-cured return flange 40 may be generally L-shaped in cross section. As such, the pre-cured return flange 40 may comprise a base portion 42 configured for bonding to the shell 20, and an upstand portion 44 extending transversely from the base portion 42 and configured for joining the pre-cured return flange 40 to the main panel 30 of the web 24. The base portion 42 of one pre-cured return flange 40 is preferably substantially co-planar with the first flange portion 32a of the C-shaped main portion 28 of the shear web 24. The base portion 42 of the other pre-cured return flange is preferably substantially co-planar with the second flange portion 32b. As such, the flange portions 32 and pre-cured return flanges 40 may together define bonding surfaces 46 via which the shear web 24 is bonded between the inner surfaces of the shell 20.

Preferably, the pre-cured return flanges 40 are composite parts. The pre-cured return flanges 40 may therefore comprise reinforcing fibres in a cured resin matrix to transfer loads between the shell 20 and the shear web 24 effectively. The reinforcing fibres are preferably in the form of one or more plies of fibrous reinforcing material 48. Preferably the pre-cured return flange 40 comprises biaxial reinforcing fibres, such as glass fibres, arranged transverse to a longitudinal axis of the flange 40. Such an arrangement of reinforcing fibres serves to ensure that the return flange 40 transfers shear loads effectively and does not take up longitudinal loads experienced by the blade 10 in use.

As will now be described with reference to the remaining figures, the pre-cured return flange 40 is formed and cured offline in a separate manufacturing process, before being co-bonded with the C-shaped main portion 28 during manufacture of the shear web 24. In a "co-bonding" process, a pre-cured element is laid up against an uncured element and a bonding medium is provided at the interface between the pre-cured and uncured elements. The elements are "co-bonded" by simultaneously bonding the pre-cured element to the uncured element and curing the uncured element. In this example, the pre-cured return flange 40 is a pre-cured element, and the C-shaped main portion 28 is made up of uncured elements during manufacture of the web 24. The term "pre-cured" is therefore used herein with reference to the state of the return flange 40 in comparison to elements of the C-shaped main portion 28 during manufacture of the shear web 24.

Figure 3A:
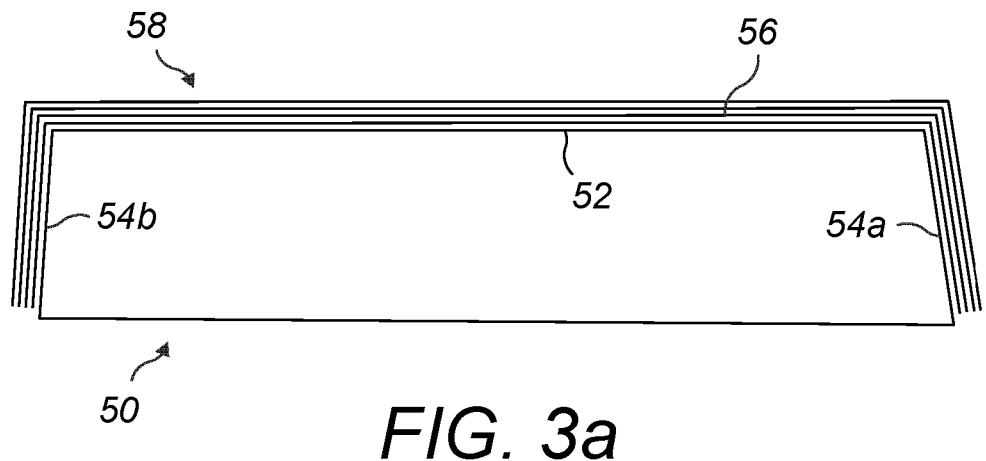
FIG. 3a is a schematic cross-sectional view of a shear web mould and fibrous material arranged on the mould to form a generally C-shaped layup.

FIG. 3*a* shows a mould 50 for forming the shear web 24 in a cross-sectional view. The shear web mould 50 comprises a main surface 52 that extends longitudinally in a direction perpendicular to the plane of the page in FIG. 3*a*. The main surface 52 is shaped to form the main panel 30 of the shear web 24. The mould 50 further comprises a first longitudinally-extending side surface 54*a* shaped to form the first flange portion 32*a* of the shear web 24, and a second longitudinally-extending side surface 54*b* shaped to form the second flange portion 32*b* of the shear web 24.

Fibrous material 56 is arranged against the main surface 52 and against the side surfaces 54*a*, 54*b* of the mould 50. In some examples, a plurality of plies of fibrous reinforcing material 56 are arranged on the shear web mould 50. Preferably, the fibrous material 56 arranged against the mould surfaces 52, 54 comprises biaxial fibres, such as biaxial glass fibres. In some examples, the fibrous material 56 arranged on the mould 50 is dry fibrous material that does not comprise resin. The fibrous material 56 forms a layup 58 that is generally C-shaped in cross-section. The fibrous material 56 arranged against the side surfaces 54*a*, 54*b* forms the first and second flange portions 32*a*, 32*b* of the shear web 24. In some examples, orienting the mould 50 with the side surfaces 54*a*, 54*b* extending substantially downwards helps to smooth out any potential wrinkles in the fibrous material 56 because gravity pulls the material down over the mould surfaces 52, 54*a*, 54*b*.

Figure 3B:
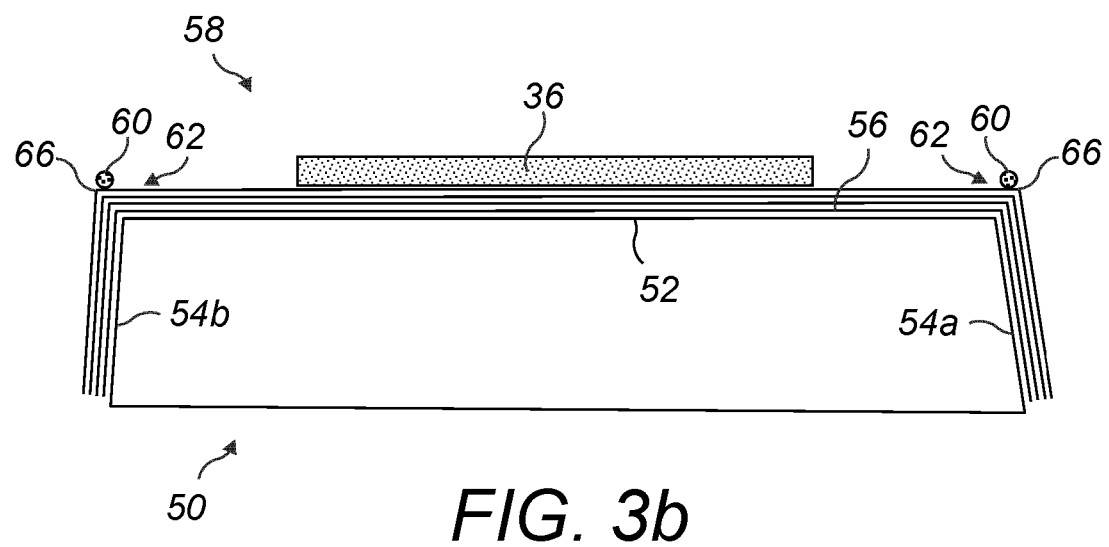
FIG. 3b shows core material arranged in the mould to form a web panel, and filler material arranged along edges of the C-shaped layup.
Figure 3C:
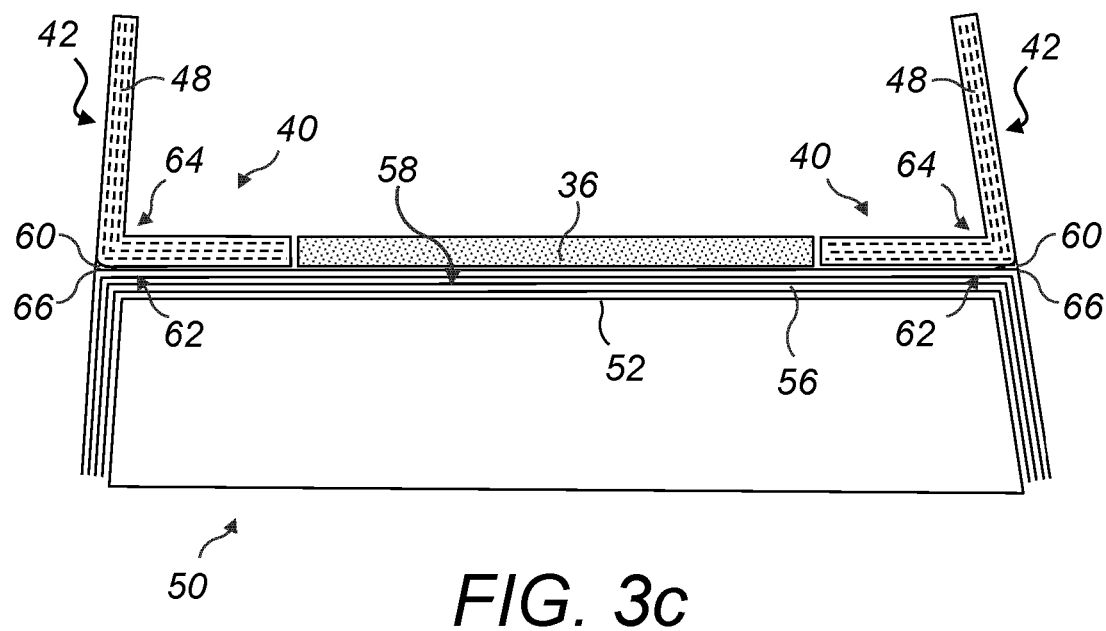
FIG. 3c shows a pre-cured return flange arranged on the layup.

With reference now to FIGS. 3*b* and 3*c*, in some examples manufacturing the shear web 24 includes arranging filler material 60 on the C-shaped layup 58 in the mould 50. The filler material 60 is preferably arranged along an edge 62 of the C-shaped layup 58. A pre-cured return flange 40 is arranged on the layup 58 on the mould 50 as shown in FIG. 3*c*. The filler material 60 is preferably arranged such that, when the pre-cured flange 40 is arranged on the mould 50, the filler material 60 is located in a space defined between the pre-cured return flange 40 and the C-shaped layup 58.

The filler material 60 may help to avoid the formation of resin rich areas in the shear web 24 during a later stage in the manufacturing process. When cured, pure resin may be relatively brittle, and fibres are therefore used to reinforce the resin throughout the shear web 24. In small areas potentially devoid of fibres, such as between a corner 64 of the pre-cured return flange 40 and C-shaped layup 58, there may be a relatively high concentration of resin. The use of filler material 60 in such areas prevents brittle spots from forming in the shear web 24, thereby increasing the durability of the shear web 24.

In examples where the pre-cured return flange 40 is substantially L-shaped in cross section, the filler material 60 may be arranged between the corner 64 of the return flange 40 and a corner 66 of the C-shaped layup 58 as shown in FIG. 3*c*. In particular, if the corners 64, 66 of the pre-cured return flange 40 and/or the C-shaped layup 58 are rounded, this can lead to a small wedge-shaped space being formed between the pre-cured return flange 40 and the C-shaped layup 58 in which there are no reinforcing fibres, and wherein the use of filler material 60 is particularly advantageous.

The filler material 60 may comprise any suitable material that helps to fill the space between the pre-cured return flange 40 and the C-shaped layup 58 to avoid the formation of a resin-rich area. In some examples, and as shown in FIG. 3*b*, the filler material 60 may comprise a bundle or rope of reinforcing fibres such as glass fibres. The use of filler material 60 ensures that the ratio of resin to fibre in this location is not substantially increased relative to the rest of the shear web 24, thereby avoiding the risk of brittle spots forming in the finished shear web 24.

The pre-cured return flange 40 preferably extends longitudinally in the mould 50 along the edge 62 of the C-shaped layup 58. As previously noted, "pre-cured" as used herein refers to the fact that the return flange 40 is already cured when it is arranged in the mould 50 together with the other parts of the web 24, such as the C-shaped layup 58 which is not cured until later on in the manufacture of the shear web 24. Preferably, the pre-cured return flange 40 comprises fibrous reinforcing material 48 to transfer loads between the shear web 24 and shell through the flange 40. The fibrous reinforcing material 48 may be fixed in a cured resin matrix prior to arranging the return flange 40 in the shear web mould 50.

Preferably, the pre-cured return flange 40 comprises a plurality of layers of fibrous reinforcing material 48 to transfer loads. The pre-cured return flange 40 is arranged in the mould 50 such that the base portion 42 extends away from the mould surface 52, i.e. the return flange 40 is substantially upstanding in the mould 50. As described by way of background, such an orientation of the return flange 40 would likely cause loose, unsupported layers of fibrous material to slide or wrinkle. This can be a particular issue in co-curing processes wherein two or more uncured elements are simultaneously cured and bonded together. However, in accordance with the present invention, the return flange 40 of the shear web 24 is pre-cured, and the pre-cured return flange 40 is co-bonded with the C-shaped layup 58. As such, the layers of fibrous reinforcing material 48 are fixed in position relative to one another in a cured resin matrix, ensuring that the fibres maintain their orientations and cannot fall or otherwise move out of position during moulding of the shear web 24. The fibres in the return flange 40 are therefore free of wrinkles when arranged in the shear web mould 50 and throughout the manufacture of the shear web 24. This results in a shear web 24 having smooth load paths free of kinks or other defects that could cause stress concentrations, thereby increasing the load-bearing capacity of the shear web 24. The pre-curing of the return flange 40 also means that the return flange 40 can be arranged unsupported in the mould 50, without risk of the fibrous reinforcing material 48 becoming displaced. As such, the pre-cured return flange 40 facilitates a simpler manufacturing process using simpler moulding apparatus and requiring less set-up time.

In some examples, core material 36 is also arranged in the web mould 50 on top of the C-shaped layup 58, when manufacturing a shear web 24 such as that shown in FIG. 2 for example. The core material 36 is preferably arranged on the main surface 52 of the shear web mould 50 which is shaped to form the main panel 30 of the shear web 24.

Figure 3D:
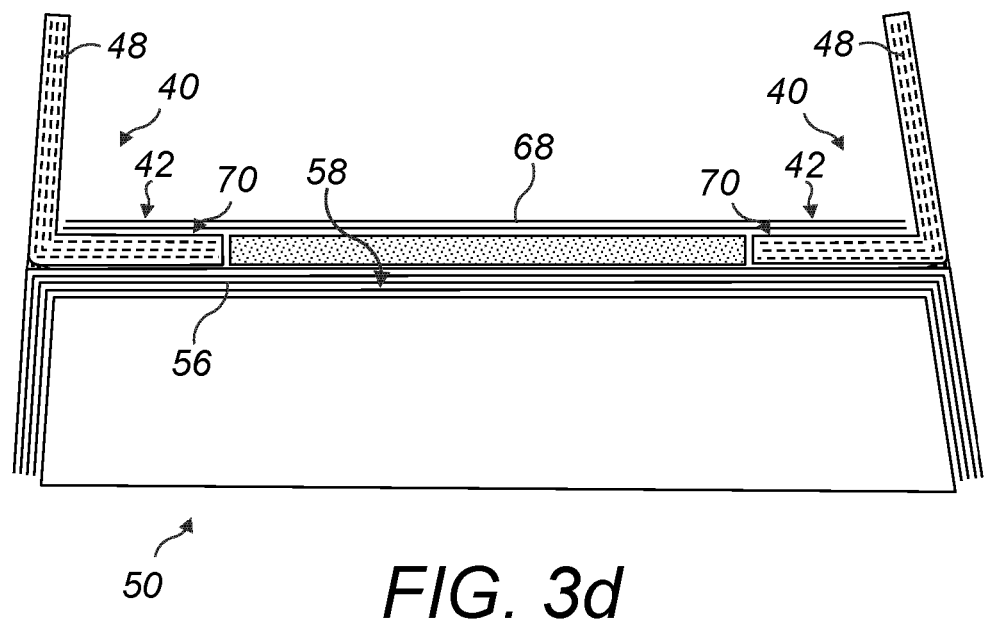
FIG. 3d shows further fibrous material arranged in the mould on top of the C-shaped layup and on top of a portion of the pre-cured return flange.

With reference now to FIG. 3*d*, one or more further layers of fibrous material 68 may be arranged in the shear web mould 50 in some examples. In some examples, the additional fibrous material 68 may be dry fibrous material that does not comprise resin. The additional layers of fibrous material 68 may be arranged on top of the C-shaped layup 58 and preferably on top of a portion 70 of the pre-cured return flange 40. Preferably, the additional layers of fibrous material 68 are arranged on top of a portion of the upstand 44 of the pre-cured flange 40, to sandwich the upstand 44 of the flange 40 between the fibrous material 56 of the C-shaped layup 58 and the additional layers 68. In some examples, the additional layers of fibrous material 68 comprise biaxial fibres, and may be formed of the same material as the layer(s) 56 of the C-shaped layup 58.

The various shear web parts arranged in the mould 50 are integrated with resin (not shown) to form the shear web 24. Uncured resin may be provided to the fibrous material 56 of the layup 58 and between the layup 58 and the pre-cured return flange 40, for example in a resin infusion process. In this example, the resin provided to the fibrous material 56 serves as the bonding medium which bonds the pre-cured elements 40 to the uncured elements 58 in the co-bonding process. In examples where a vacuum assisted resin transfer moulding (VARTM) process is used to form the shear web 24, the method may additionally include arranging a vacuum film (not shown) to encapsulate the shear web parts on the mould 50 and form a sealed volume between the mould 50 and the vacuum film. The sealed volume may subsequently be filled with uncured resin under vacuum pressure. In some other examples, the fibrous material 56 of the C-shaped layup 58 and/or the additional layers of fibrous material 68 may be prepreg material that is pre-impregnated with uncured resin prior to arrangement in the mould 50, reducing or removing the need for a resin infusion. In other examples the fibrous material 56, 68 may be a combination of dry and prepreg fibrous material. Preferably, the uncured resin is a polymer-based resin such as an epoxy resin. Because the return flange 40 is pre-cured, the resin of the return flange 40 and the uncured resin provided to the fibrous material 56 of the layup 58 do not mix.

The uncured resin provided to integrate the parts of the shear web 24 in the mould 50 is allowed to cure naturally, or is cured to a specific curing schedule. This may involve the application of heat and/or pressure to the layup 58 on the shear web mould 50. By curing the resin to integrate the parts of the shear web 24, or allowing the resin to cure, the pre-cured return flange 40 is co-bonded with the C-shaped layup 58.

The pre-cured return flange 40, in particular the resin in the return flange 40, remains set throughout the curing of the shear web resin, and the fibrous reinforcing material 48 in the return flange 40 remains fixed in the cured resin throughout. The pre-cured return flange 40 is therefore preferably formed of a material which, once cured, has a glass transition temperature that is greater than the temperature required to cure the resin and integrate the C-shaped layup 58 to form the shear web 24. This is particularly preferable where the pre-cured return flange 40 is formed using a thermoplastic polymer-based resin.

Preferably, the heat applied to cure the C-shaped lay-up 58 and co-bond the pre-cured return flange 40 with the C-shaped layup 58 is lower than the maximum heat degrading temperature of the pre-cured return flange 40. If excessive heat is applied to cure the layup 58, crosslinked polymer chains in the pre-cured return flange 40 may break and cause the return flange 40 to lose its mechanical properties required for transferring loads during operation.

Figure 4:
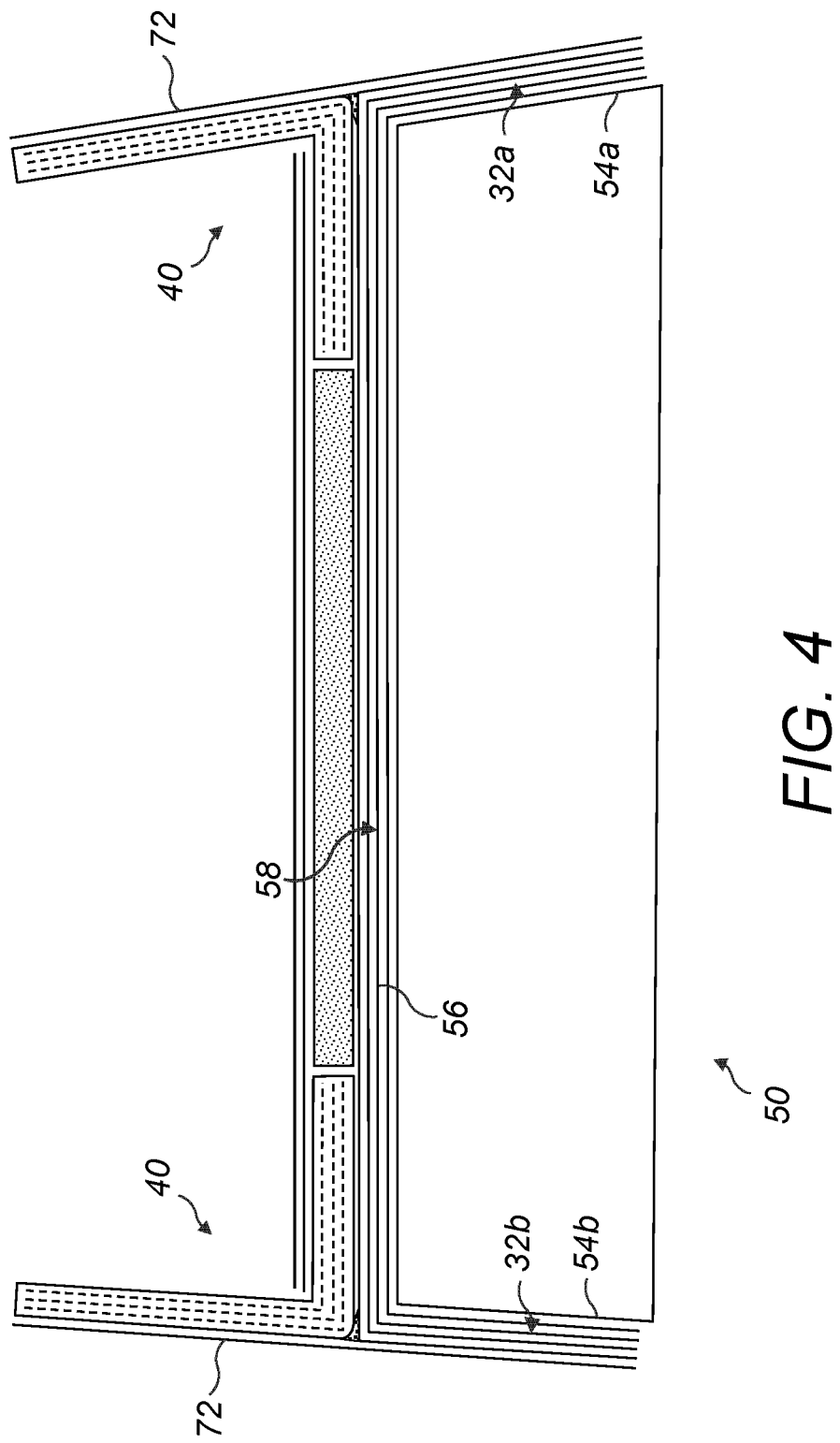
FIG. 4 shows a shear web mould and layup in an example where base layers of fibrous material are arranged at the sides of the mould.

In some examples, the method of manufacturing a shear web 24 may comprise additional or alternative steps to those described above with reference to FIGS. 3a to 3d. For example, as shown in FIG. 4, the shear web 24 may comprise a base layer of fibrous reinforcing material 72 spanning the pre-cured return flange 40 and the first or second flange portion 32a, 32b. In such an example a base layer of reinforcing fibrous material 72 may be arranged with a side surface 54a, 54b of the mould 50 in such a way that it spans the pre-cured flange 40 and the fibrous material 56 of the C-shaped layup 58 forming the respective first or second flange portion 32a, 32b. The base layer 72 may comprise dry fibrous material or prepreg fibrous material. In other examples, the base layer 72 may be a pre-cured layer. The inclusion of a base layer 72 may provide a smoother or more level bonding surface 46 via which the shear web 24 may be connected to the shell 20.

Figure 5:
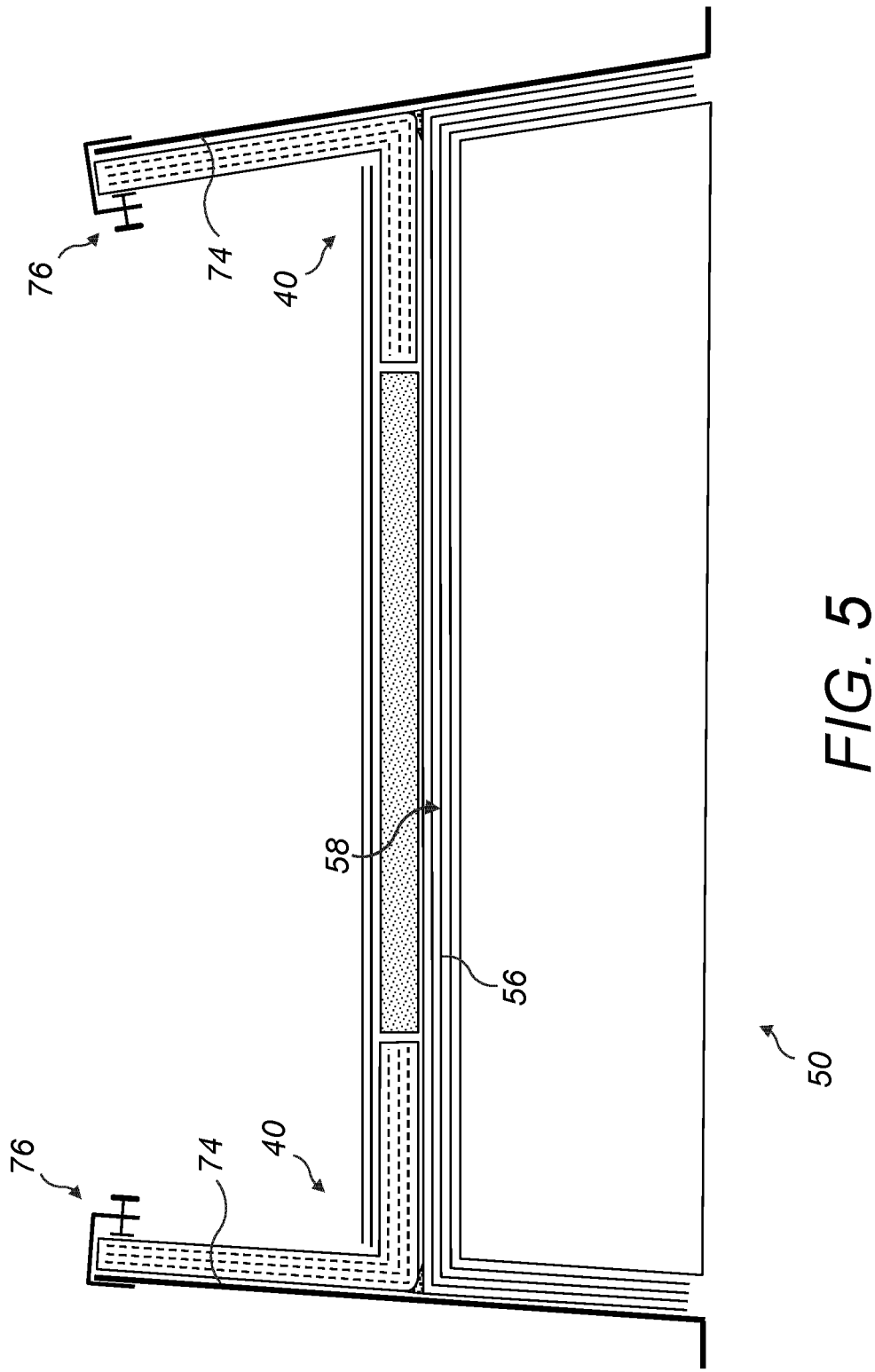
FIG. 5 shows a further example of a shear web mould having additional side portions configured to form base portions of the shear web flanges.

In some other examples, as shown in FIG. 5, the shear web mould 50 may additionally comprise one or more additional mould surfaces 74 configured to form the bonding surfaces 46 of the shear web 24. Moulding the bonding surfaces 46 against such additional mould surfaces 74 may further improve the quality and finish of the bonding surfaces 46. Providing additional mould surfaces 74 may further facilitate more accurate alignment of the pre-cured return flange 40 in the mould 50. For example, the pre-cured return flange 40 may be temporarily fixed to the additional mould surface 74 by a clamp 76 or clip until the resin co-bonding the return flange 40 with the C-shaped layup 58 has cured.

Whilst the filler material 60 in the examples described above comprises a rope or bundle of reinforcing fibres, in other examples the shear web 24 may comprise filler material 60 comprising any other suitable material capable of decreasing the concentration of resin in a specific area. For example, the filler material 60 may comprise materials such as foam, polystyrene or balsa. Such materials are lightweight and therefore do not add significant mass to the blade 10 whilst reducing the risk of a resin-rich area forming between the pre-cured flange 40 and the fibrous material 56 of the C-shaped layup 58. In examples where the filler material 60 comprises foam, the foam is preferably a closed-cell foam in order to restrict the volume of resin in the space between the pre-cured flange 40 and C-shaped layup 58.

In yet other examples, the filler material 60 may instead comprise adhesive. In such an example, the method may comprise depositing un-cured adhesive on the fibrous material 56 of the C-shaped layup 58 such that, when the pre-cured return flange 40 is arranged in the mould 50, the adhesive is located between the corner 64 of the flange 40 and the corner 66 of the C-shaped layup 58. The filler adhesive may be cured concurrently with the curing of the resin used to co-bond the pre-cured return flange 40 and the C-shaped layup 58 to form the shear web 24. Alternatively or additionally, the method may comprise arranging a wedge of cured adhesive on the fibrous material 56 of the C-shaped layup 58 such that the cured adhesive is located between the corner 64 of the pre-cured return flange 40 and the corner 66 of the C-shaped layup 58 when the flange 40 is arranged in the mould 50.

Whilst FIG. 3d shows the fibrous material 56 of the C-shaped layup 58 and the additional fibrous material 68 sandwiching both the flange 40 and the core material 36 of the main panel 30, in some other examples, the method may comprise arranging the layers of fibrous material 56, 68 in a different order. For example, fibrous material may be arranged such that an intermediate layer sandwiches the core material 36 but not the pre-cured return flange 40. The filler material 60 and pre-cured return flange 40 may then be arranged on top of such intermediate layers, with additional fibrous material 68 being arranged on top of the core material 36 and a portion 70 of the pre-cured return flange 40. In yet other examples, intermediate layers of fibrous material may be arranged to sandwich a portion of the pre-cured return flange 40 and not the core material 36 of the web panel 30. Additional fibrous material 68 may then be arranged on top of the core material 36 and a portion 70 of the pre-cured return flange 40.

Whilst structural foam is provided above as an example of the core material 36 that may be comprised in the main panel 30 of the shear web 24, any other suitable material may be used as the core material 36. For example, the core material 36 may comprise other materials such as balsa, reinforcing fibres, polymer or other composite materials. Alternatively, the core material 36 may comprise a lightweight honeycomb structure panel formed of any suitable material.

The pre-cured return flange 40 may be a moulded part. For example, it may be pre-manufactured offline in a different manufacturing process to that of the shear web 24. Preferably the pre-cured return flange 40 is formed in a separate composite moulding process. The pre-cured return flange 40 may be formed on, or in, a return flange mould. The pre-cured return flange 40 may be formed of the same material as the C-shaped main portion 28 of the shear web 24. For example, the pre-cured return flange 40 may be formed of glass fibre reinforced plastic (GFRP).

As the pre-cured return flange 40 is formed in a different manufacturing process, it may have a geometry that would be difficult to achieve if a return flange was moulded simultaneously with the C-shaped layup 58. For example, the pre-cured return flange 40 may have a base portion 42 and an upstand portion 44 arranged at an acute angle to each other. Such an acute angle would be difficult to form if the return flange is moulded simultaneously with the C-shaped layup 58. However, with a pre-cured return flange 40 formed offline, such an acute angle may be formed relatively easily on a male mould.

In accordance with examples of the present invention, the pre-cured return flange 40 of the shear web 24 is co-bonded with the C-shaped main portion 28 of the web 24. As such, the I-shaped shear web 24 is formed with the pre-cured return flange 40 integrated with the web panel 30 and first and second flange portions 32a, 32b of the C-shaped main portion 28. A shear web in accordance with examples of the present invention therefore does not require additional assembly or bonding processes during manufacture to attach a return flange to a separately formed shear web. This advantageously reduces cycle times for manufacturing the web 24, because the return flange 40 is attached to the main portion 28 at the same time as the main portion 28 is cured. Further, co-bonding the return flanges 40 with the main portion 28 of the shear web 24 minimises the risk of stress concentrations forming between the return flange 40 and main portion 28 of the web 24.

Many modifications may be made to the examples described above without departing from the scope of the present invention as defined in the accompanying claims. It will be appreciated that features described in relation to each of the examples above may be readily combined with features described with reference to other examples without departing from the scope of the invention as defined by the following claims.

The invention claimed is:

1. A method of making a wind turbine blade shear web, the method comprising:
    providing a shear web mould having a longitudinally-extending main surface shaped to form a main panel of the shear web, the main surface having a planar portion, and first and second longitudinally-extending side surfaces extending from the main surface in a first direction and a second direction, respectively, and shaped to form respective first and second flange portions of the shear web,
    arranging one or more layers of fibrous material against the main surface and against the first and second side surfaces of the mould to form a layup that is generally C-shaped in cross-section;
    arranging a pre-cured return flange on the layup such that a portion of the pre-cured return flange overlies the planar portion of the main surface of the mould and no portion of the pre-cured return flange extends in the first or second directions toward the first or second side surfaces, respectively, the pre-cured return flange being generally L-shaped in cross-section;
    providing uncured resin to the fibrous material of the layup and between the layup and the pre-cured return flange; and
    curing the uncured resin to co-bond the pre-cured return flange and the C-shaped layup.

2. The method of claim 1, wherein the pre-cured return flange comprises fibrous reinforcing material.

3. The method of claim 1, further comprising arranging filler material in a space defined between the pre-cured return flange and the C-shaped layup.

4. The method of claim 3, wherein the filler material is arranged between a corner of the pre-cured return flange and a corner of the C-shaped layup.

5. The method of claim 3, wherein the filler material comprises one or more of: reinforcing fibres, foam, polystyrene, balsa and cured or uncured adhesive.

6. The method of any of claim 3, wherein the filler material comprises a rope of fibres.

7. The method of claim 1, further comprising arranging one or more further layers of fibrous material on top of the C-shaped layup and on top of a portion of the pre-cured return flange such that said portion is sandwiched between layers of fibrous material.

8. The method of claim 1, wherein the one or more layers of fibrous material comprise biaxial fibres.

9. The method of claim 1, further comprising arranging a base layer of fibrous reinforcing material at one side of the mould such that it spans the pre-cured return flange and the first or second flange portion of the C-shaped layup.

10. The method of claim 9, wherein the base layer is a layer of dry or prepreg fibrous material or a pre-cured layer.

11. The method of claim 1, wherein the pre-cured return flange is a moulded part.

12. The method of claim 2, wherein the pre-cured return flange includes a base portion and an upstand portion, and wherein arranging the pre-cured return flange on the layup includes arranging the pre-cured flange such that a portion of the upstand portion overlies the main surface of the mould.

13. The method of claim 12, wherein arranging the pre-cured return flange on the layup comprises arranging the pre-cured return flange such that the base portion extends in a direction opposite to the first direction or the second direction.

14. The method of claim 12, wherein the one or more layers of fibrous material against the first and second side surfaces of the mould defines an outermost layer of fibrous material, and wherein arranging the pre-cured return flange comprises arranging the pre-cured return flange such that a surface of the base portion and the outermost layer of fibrous material are co-planar.

15. The method of claim 1, wherein the pre-cured return flange comprises biaxial fibrous reinforcing material.

16. The method of claim 1, wherein the shear web mould further includes an additional planar mould surface, and wherein the method further includes moulding the one or more layers of fibrous material on at least one of the first and second side surfaces of the mould against the additional planar mould surface.

17. The method of claim 16, wherein the method further comprises moulding at least a portion of the pre-cured return flange against the additional planar mould surface.

* * * * *

UNITED STATES PATENT AND TRADEMARK OFFICE
CERTIFICATE OF CORRECTION

| | | |
|---|---|---|
| PATENT NO. | : 12,429,024 B2 | Page 1 of 1 |
| APPLICATION NO. | : 18/253504 | |
| DATED | : September 30, 2025 | |
| INVENTOR(S) | : Laura Fariña Nercellas et al. | |

It is certified that error appears in the above-identified patent and that said Letters Patent is hereby corrected as shown below:

In the Claims

Column 10, Claim 6, Line 32, change "method of any of claim 3" to -- method of claim 3 --.

Column 10, Claim 12, Line 48, change "method of claim 2" to -- method of claim 1 --.

Signed and Sealed this
Twenty-third Day of December, 2025

John A. Squires
*Director of the United States Patent and Trademark Office*